Patented Dec. 11, 1945

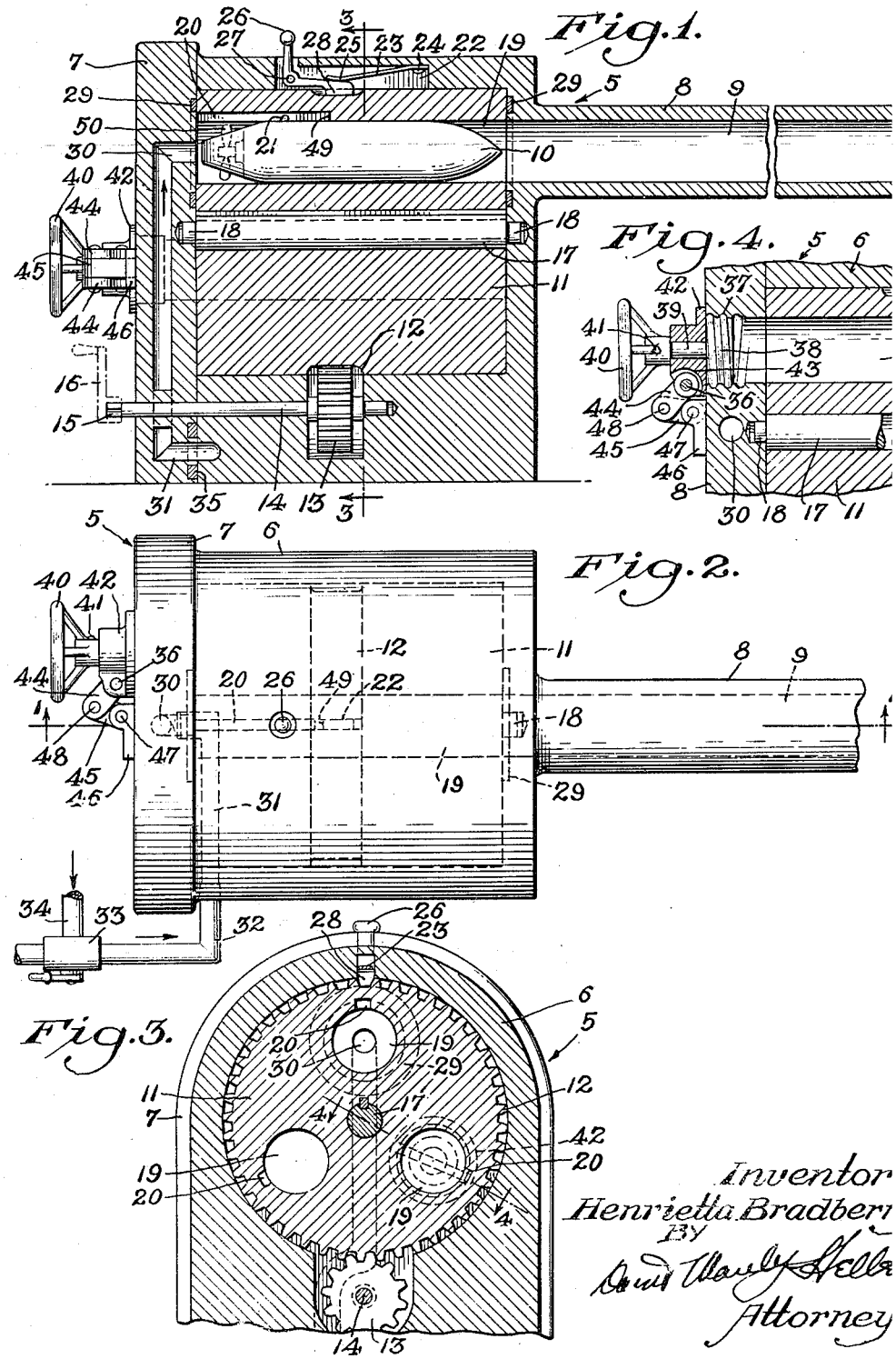

2,390,688

UNITED STATES PATENT OFFICE 2,390,688

TORPEDO DISCHARGE MEANS

Henrietta Bradberry, Chicago, Ill.

Application January 8, 1945, Serial No. 571,744

4 Claims. (Cl. 114—238)

My invention described in the instant application appertains to torpedo discharge means, and is in part a continuation of my co-pending parent application Serial Number 525,692, filed March 9, 1944.

An important object, of the invention disclosed herein, is to provide torpedo discharge means operated pneumatically and adapted to discharge torpedoes below the surface of a body of water, the said torpedo discharge means being located in such water craft as submarines or in sub-terranian forts similar to the invention disclosed in my co-pending application serial number hereinabove designated.

Another object of my invention is to provide a torpedo discharge means which is adapted to automatically trip the porpelling means of torpedoes discharged therethru concurrently with the initial travel or projection of the said torpedoes within the said discharge means.

Another object of my invention is to provide torpedo discharge means which will be operative to effectively and efficiently discharge torpedoes below the surface of a body of water, the said torpedo discharge means being provided with an outlet submerged below the surface of a body of water and extending thereinto; the said torpedo discharge means being so constructed as to prevent the water pressure from penetrating into the effective mechanism thereof.

Another object of my invention is to provide torpedo discharge means which is practical in its construction, efficient and useful in its operation, and of such simple construction that it can be produced economically in quantity production.

Other objects, features, and advantages inherent in my invention will become apparent from an examination of the accompanying drawing, having particular reference to the ensuing description, wherein like parts are designated by like symbols, and in which:

Fig. 1 is a longitudinal cross-sectional view substantially, taken on the line 1—1 of Figure 2.

Fig. 2 is a top view of the view shown in Figure 1.

Fig. 3 is a transversal cross-sectional view taken approximately on the line 3—3 of Figure 1.

Fig. 4 is an enlarged detailed view showing the inlet to the torpedo discharge means, where torpedoes are initially inserted preparatory to being discharged into and below the surface of a body of water.

Referring to the various figures, the torpedo discharge means comprising my invention is, generally, designated 5, and is comprised of a body 6, and an enlarged flange section 7, secured to the body 6, the body also being provided with a discharge tube 8, having a suitable bore 9 therein in order to effectively discharge torpedoes 10 which may be passed therethru, and subsequently ejected from the outlet tube 8 into and below the surface of a body of water.

Within the body 6 is mounted a rotating drum 11, pivoted or rigidly secured to a shaft 17, having trunnions 18 journalled within the body 6, whereby the drum 11 is adapted to be rotated. The drum, approximately at its mid-portion, is provided with a geared portion 12 which is adapted to mesh with the pinion 13 secured to the shaft 14, journalled suitably within the body 6, and having a squared extension 15 adapted to be engaged by a manipulating handle 16. The drum 11 is sealed within the body 6 by gaskets 29, so that the openings or bore 19 therein when brought into alignment with the discharge bore 9, will prevent water from seeping into the operative mechanism of the discharge tube means.

A conduit 32 is connected to the body 6, which in turn is connected to an air pressure valve 33, in turn connected thru the conduit 34 to a proper source of supply such as a compressor, or other suitable source of air pressure supply.

The torpedoes 10 are provided with the proper propulsion mechanism indicated at 50, and a trigger or starter 21 which slides freely within the slotted groove 20 until it passes or strikes the abutment 49, which causes the trigger 21 to be tripped setting the operable mechanism 50 of the torpedo in motion, so that when it is ultimately discharged it will be propelled under its own power toward the target to which it may be directed.

The air pressure means 32 is connected to the duct 31, which is also sealed by a gasket 35 so as to prevent seepage of air therethru, and is in turn connected to the conduit 30 which opens into the chambers 19 of the drum 11.

In order to hold the passage or bore 19 in registry with the bore 9, a pawl arrangement is indicated at 26 which may be manipulated by the hand of the person operating the same, the said pawl being pivoted at 27 and having a tooth of pawl formation 28 adapted to mesh with the gear teeth 12 in the drum 6, the body is recessed at 22 in order to accommodate the flat leaf spring 23 anchored at 24 and provided with a terminus 25 exerting pressure on the tooth 28 tending to maintain it, normally, in engagement with any one of the teeth 12 which is brought in mesh therewith.

The torpedoes are inserted into the opening 19 by means of the structure indicated in Figure 4, where it can be noted that the flange portion 7 is recessed with an opening to match the bore 19, and is threaded with a coarse Whitworth thread 37 to match the male Whitworth thread 38 on the axle 39 to which is secured the hand-wheel 40 by means of an attaching pin 41; the axle 39 being adapted to rotate within the flange casting 42. The said flange 42 is provided with a recess portion 43, the linkage 44 and 47 being connected respectively at 36, and linkage 44 and 45 being articulately secured at 36 and 47 and also being adapted to hinge at 48, the pivot 47 is secured to a casting bracket or bearing 46 which is secured to the flange 7 by any suitable means not shown.

*Operation*

In order to operate my invention, a torpedo 10 is placed within the opening 19 in the drum 6 by turning the hand wheel 40 so as to loosen the thread 38 from engagement with the thread 37, thus permitting the joint assembly of the casting 42 and the hand wheel 41 to be articulated by virtue of the linkage 44 and 34 as heretofore expounded. After the torpedo is placed in the cavity 19 of the drum 6, the assemblage of the hand wheel structure is brought into alignment with the passage 19, and the thread 38 is once more caused to engage the threaded portion 37 causing the casting 42 to be seated firmly against the flange 7 so as to prevent air pressure leakage of any kind.

After this has been accomplished, the air pressure valve 33 is opened releasing the air pressure and conducting it into the opening 19 behind the torpedo mechanism causing the torpedo to be propelled forward until the tripper dog or trigger 21 is tripped by the abutment 49, setting the torpedo motivating mechanism 50 in operation, so that the torpedo is then discharged under its own power and directed toward the target, thru the discharge tube means 9.

The cycle of operation is repeated by manipulating the handle 26 to release the locking pawl 28 from engaging the drum 11, then bringing another cavity 19 of the drum 11 into proper alignment with the discharge outlet 9 and the hand-wheel assemblage 40 for insertion of torpedoes; this is done by manipulating the handle 16 and rotating the pinion 13 which engages the teeth 12, thus bringing the drum into proper alignment, and then releasing the locking pawl 28 permitting the potential energy in the spring 23 to force the tooth 28 into locking engagement, securely maintaining the drum in locking position during the discharge operation to follow, thus the cycle is repeated.

Altho, I have, herein, described and revealed my invention, and inasmuch as it is susceptible of various modifications, I reserve the right to all such modifications coming within the scope and spirit of my invention; my invention to be limited only to the subjoined claims.

Having thus described and revealed my invention, what I claim as novel and desire to secure by Letters Patent is:

1. Torpedo discharge means comprising, a body, a magazine having a multiplicity of torpedo holding sections, the said magazine being rotatably confined within the said body, each of said torpedo holding sections provided with an elongated recess terminating in an abutment to trip the propelling mechanism of a torpedo, torpedo outlet means provided on said body extending into and below the surface of a body of water, gearing means secured within said body associated with the said magazine adapted to index the said torpedo holding sections in co-axial alignment with the said torpedo outlet means, locking pawl means secured within the said body and cooperating with the said gearing means adapted to maintain fixedly and releasably the co-axial alignment of said torpedo holding sections and the said torpedo discharge outlet, pressure means located in the said body and communicating with the said torpedo holding sections adapted to initially direct a torpedo thru the said torpedo holding sections and the said torpedo outlet means, and loading cover means articulately secured to the said body and adapted to be releasably and sealably secured to the said body.

2. Torpedo discharge means comprising, a body having a torpedo charging section, a torpedo discharge section emanating into and below the surface of a body of water, a torpedo retaining magazine rotatably confined in the said body and provided with a multiplicity of torpedo retaining chambers, each of said chambers provided with abutment means adapted to initiate operation of the propelling mechanism of a torpedo, pressure conduit means in said body adapted to fire the torpedoes, gearing means in said body and on the said magazine adapted to align its chambers with the said torpedo discharge section, and locking pawl means in said body adapted to engage the gearing means on said magazine to maintain fixed alignment between said chambers and the said torpedo discharge section.

3. Torpedo discharge means comprising, a body having a torpedo charging section, a torpedo discharge section emanating into and below the surface of a body of water, a torpedo retaining magazine rotatably confined in the said body and provided with a multiplicity of torpedo retaining chambers, each of said chambers provided with abutment means adapted to initiate operation of the propelling mechanism of a torpedo, pressure conduit means in said body adapted to fire the torpedoes, gearing means in said body and on the said magazine adapted to align its chambers with the said torpedo discharge section, and manually operable and spring urged pawl means in said body adapted to engage the gearing means on said magazine to maintain fixed alignment between said chambers and the said torpedo discharge section.

4. Torpedo discharge means comprising, a body, a magazine having a multiplicity of torpedo holding sections, the said magazine being rotatably confined within the said body, each of said torpedo holding sections provided with an elongated recess terminating in an abutment adapted to trip the propelling mechanism of a torpedo, torpedo outlet means provided on said body extending into and below the surface of a body of water, gearing means secured within said body associated with the said magazine adapted to index the said torpedo holding sections in co-axial alignment with the said torpedo outlet means, locking pawl means secured within the said body and cooperating with the said gearing means adapted to maintain fixedly and releasably the co-axial alignment of said torpedo holding sections and the said torpedo discharge outlet, pressure means located in the said body and communicating with the said torpedo holding sections adapted to initially direct a torpedo thru the said torpedo holding sections and the said torpedo outlet means, and loading cover means articulately secured to the said body and adapted to be releasably and sealably secured to the said body, the said loading cover means comprising, a cover hingedly secured to the said body, an axis rotatably confined in the said cover and provided with a coarse threaded male section at one of its ends, a threaded female section in the said body adapted to engage the said threaded male section, and a hand-wheel secured to the other end of said axis.

HENRIETTA BRADBERRY.